United States Patent
Adams

[15] 3,684,955
[45] Aug. 15, 1972

[54] WIDEBAND BALANCED CURRENT PROBE

[72] Inventor: Duane J. Adams, Merritt Island, Fla.

[73] Assignee: Martin Marietta Corporation, New York, N.Y.

[22] Filed: July 6, 1970

[21] Appl. No.: 52,333

[52] U.S. Cl............................324/72, 324/127
[51] Int. Cl.....................................G01r 31/02
[58] Field of Search......324/127, 72, 30 A; 336/175, 336/176

[56] References Cited

UNITED STATES PATENTS 3,028,539  4/1962  Wright..................324/127 X

FOREIGN PATENTS OR APPLICATIONS 987,310  3/1965  Great Britain.............324/127

Primary Examiner—Alfred E. Smith
Attorney—Julian C. Renfro and Gay Chin

[57] ABSTRACT

A wideband balanced current probe utilized for the detection and accurate measurement of very small currents flowing in a wire disposed in an environment involving extremely high electric and magnetic fields. My probe principally comprises a toroidal core having an electrically symmetrical bifilar wound coil disposed thereon and being protected from the high energy environment by a conductive, nonmagnetic shield. This probe provides a pair of symmetrical output signals which may be trimmed to provide even more precise electrical symmetry. The pair of symmetrical output signals is summed in phase and conveyed without contamination from the high energy field through properly balanced and shielded conductors to a relatively remote data recording unit.

6 Claims, 9 Drawing Figures

PATENTED AUG 15 1972

INVENTOR
DUANE J. ADAMS

BY *Julian C. Renfro*

ATTORNEY 3,684,955

WIDEBAND BALANCED CURRENT PROBE

BACKGROUND OF THE INVENTION

1. Field of the Invention

The area with which my invention is concerned involves the need, in conjunction with certain classified projects, to acquire wideband pulse data from an environment which contains extremely high magnetic and electric fields. The desired data can involve currents as small as 100 to 200 microamperes in a field which may exceed 100,000 volts per meter. Data obtained from probes used in such an environment is subject to contamination by common mode injection components due to so called antenna effects, which components may be as much as twenty times greater in amplitude than the desired signal.

2. Description of the Prior Art

Conventional current probes used for acquiring wideband pulse data have involved single ended signal circuits, with which double and triple shielding techniques have been used, but with very little improvement in the signal-to-noise ratio. Because of the failure of conventional current probes to provide satisfactory data in such environments, some technicians have even gone so far as to try to convert data into a light pulse by the use of a gallium arsenide diode, and to utilize fiber optics as a means of transmitting the data through the contaminated environment. Success in such instances has been quite limited in view of excess space requirements in the test article, high cost, complexity, and the like.

SUMMARY OF THE INVENTION

The present invention very convincingly overcomes the distinct disadvantages accompanying the use of prior art current probes in extremely high electric and magnetic fields by providing a wideband, balanced current probe utilized in conjunction with properly shielded and balanced readout equipment. My novel probe entails the use of a bifilar winding, disposed for a plurality of turns upon a suitable toroidal core to form a coil assembly that is in turn disposed in a conductive but non-magnetic shield. Special techniques are used to assure balanced windings, so that a very high degree of electrical symmetry will be obtained, and so that common mode components will be rejected. Significantly, my probe can be used for measuring data as small as 100 to 200 microamperes in an environment of 100,000 volts per meter.

The primary embodiment of my device involves the use of a toroidally- shaped probe through the center of which a conductor whose current flow is to be measured may extend. However, inasmuch as it may be desired to measure current flow in a conductor whose end is not available to be threaded through the toroid, another embodiment of my invention involves the use of a split toroid, whose halves may be moved apart to allow the probe to be placed around one or more conductors, and then reclosed.

The readout equipment involves the use of very sensitive means for acquiring and recording the data derived by the use of the probe, with which the output leads of my device are connected. The balanced leads herein involved are multiple shielded in a very effective manner, as are the components used in conjunction with the acquiring and recording means, with all of the active components being carefully balanced so as to assure that data of the highest possible accuracy will be obtained.

It is therefor the primary object of my invention to provide a wideband, balanced current probe providing sensitive data uncontaminated by common mode components.

It is another object of my invention to provide a novel toroidal probe, using a balanced bifilar winding.

It is yet another object of my invention to provide a very sensitive current probe utilized with a hardened data-acquisition system so that low level data may be taken from a hostile environment while maintaining the integrity of the data.

These and other objects, features and advantages of my invention will be more apparent from a study of the appended drawings in which.

DETAILED DESCRIPTION

Figure 1:
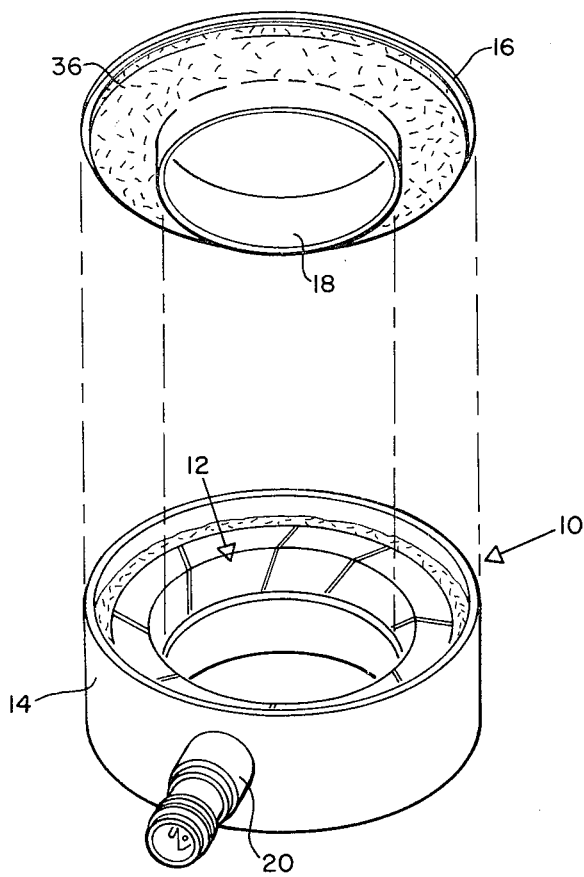
FIG. 1 is a perspective view of a principal embodiment of my balanced current probe, with the cover portion of the device removed to reveal internal construction.

Turning to FIG. 1, it will be seen that I have there depicted a wideband, highly symmetrical balanced current probe 10 in accordance with this invention, involving a coil assembly 12 of generally toroidal configuration disposed in a generally toroidal case 14 of conductive, nonmagnetic material. The cover portion of the case is formed by a close-fitting member 16 having an inner flange 18, so that except for the provision of an inner circumferential gap, the case, when the cover is in place, encloses the coil assembly. A suitable, balanced r. f. connector 20 is provided on the case so that the signals developed in the coil assembly can be transferred to a remote location. These details will be dealt with hereinafter at greater length.

Figure 2:
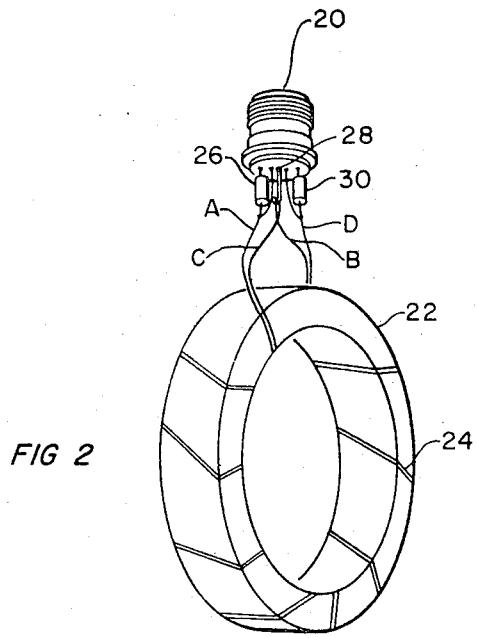
FIG. 2 is a perspective view of the coil assembly utilized in the embodiment of Figure 1, with the connections of the bifilar winding to the output connector being revealed in some detail, and with the lead lengths involved in the connections being exaggerated in the interest of clarity.

As revealed somewhat in FIG. 1, but in greater detail in FIG. 2, the coil assembly 12 principally involves a suitable core 22 upon which a bifilar winding 24 is disposed. The winding may be regarded as representing a coil having say eight turns, with the pair of wire ends at one terminus of the coil being designated A and C and the wire ends at the other terminus being designated B and D; see FIG. 2.

The core 22 is preferably made of ferrite, which is a compound of iron oxide in combination with various metallic oxides, such as manganese, magnesium, nickel and zinc. Although I am not to be so limited, I prefer to utilize cores made by Indiana General Corporation of Keasbey, New Jersey. For example, their core known as Ferramic 0-5 is stated to be suitable for operation over the frequency range from audio to approximately 400 $KH_z$, and normally is suitable for my purposes. By extensive testing I have found that it provides the best compromise in the range between 50 $KH_z$ and 100 $MH_z$. However, in other instances I may for example prefer to use a Ferramic Q-1 core, which exhibits good low-loss characteristics up to 10 $MH_z$, or a Ferramic Q-2 core, which is particularly suitable up to 50 $MH_z$.

One particular core utilized has an outer diameter of 2.4 inches and an inner diameter of 1.875 inches, and is one-half inch thick, this being known as an Indiana General Type CF-123 X core, which is of 0-5 material. This particular core was utilized in the configuration shown in FIGS. 1 and 2, as well as being used in the embodiment of FIGS. 5 through 8 after modification. A case containing this core has typically an inner diameter of 1 ⅝ inches.

FIG. 2 reveals that wire end A is attached to one terminal of the connector 20 as well as to a trimming component 26, which may be a loading resistor of 39 ohms in the event a 78 ohm balanced system is used, whereas the other member of this pair of wire ends, wire end C, is connected to a grounding post 28 on the connector 20.

The connections made by the wire ends at the opposite terminus of the coil, ends B and D, are also revealed in FIG. 2, with end B being connected along with end C to the grounding post, and end D connected to the other terminal of connector 20 as well as to trimming component 30, which, again, may be a loading resistor of 39 ohms. Obviously, the component values of 26 and 30 would be changed if other system impedance values are to be utilized.

Inasmuch as electrical balance between the two winding halves is most important, the components 26 and 30 are carefully matched to each other. I prefer to match the resistance of the components 26 and 30 within 0.01 ohms, accomplished by use of a precision instrument. By exhaustive tests I found that certain resistors manufactured by Corning Glass Company do not degrade due to soldering, and hence are preferred. They have temperature coefficients equal to or better than 55 parts per million. Typically, I use Corning resistors having part number RN 55 D 39.0 ROF, but obviously I am not to be limited to this.

Those skilled in this art will recognize that the symmetry of the overall system is a function of the symmetry of each half of the total system, so therefore it is most important to construct the current probes so that they are both electrically and mechanically symmetrical. However, it should be noted that by virtue of the use herein of a bifilar winding, the dimensional variations as well as electrical variations seen by one wire are also seen by the adjacent wire.

The bifilar conductors may be made by cutting two wires to proper length, and after assuring that they are evenly spaced and there are no crossovers, I then secure them together in a parallel fashion, such as by the use of polyurethane varnish. I prefer to use No. 34 copper wire, such as Formvar, made by York Wire Company. The preferred free space surge impedance of this line is 40 ohms.

It is usually not possible to achieve a perfectly balanced arrangement each time a coil assembly is first placed in a case. For example, the wire end A may be a bit closer to the case than another wire end, thus providing a larger capacity from wire A to the case, and increasing the common mode component, which is to decrease the common mode rejection ratio. Accordingly, during final test, it is within the purview of my invention to compensate by moving wire A, for example, nearer to or farther from the case as required to balance the distributed capacity. However, if necessary, I can utilize a trimmer capacitor where needed, as for example as indicated at $C_1$ in FIG. 3.

Figure 3:
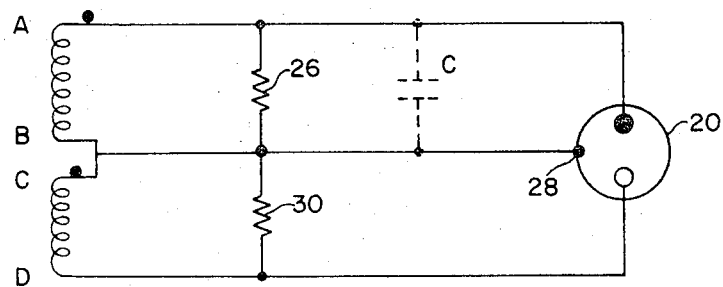
FIG. 3 is a simplified wiring diagram revealing the manner in which the coils constituting the bifilar winding are electrically connected.

With regard to FIG. 3, it will be noted that wire end A is associated with the same wire or coil as is wire end B. Likewise, ends C and D are each located on the same wire or coil winding. It will be understood that the dots associated with the two coils indicate that the coils are phased so that they are in a summing relationship. If proper phasing is not utilized, only the common mode components are presented at the output of the probe, which would of course be entirely unacceptable.

After assembly into the case is complete, the probe is polarized, and polarized connectors are used throughout the system in order to maintain predictable polarity. This is most important in a pulse analysis application, where the test setup must be duplicated at a later date for comparison purposes.

Figure 4:
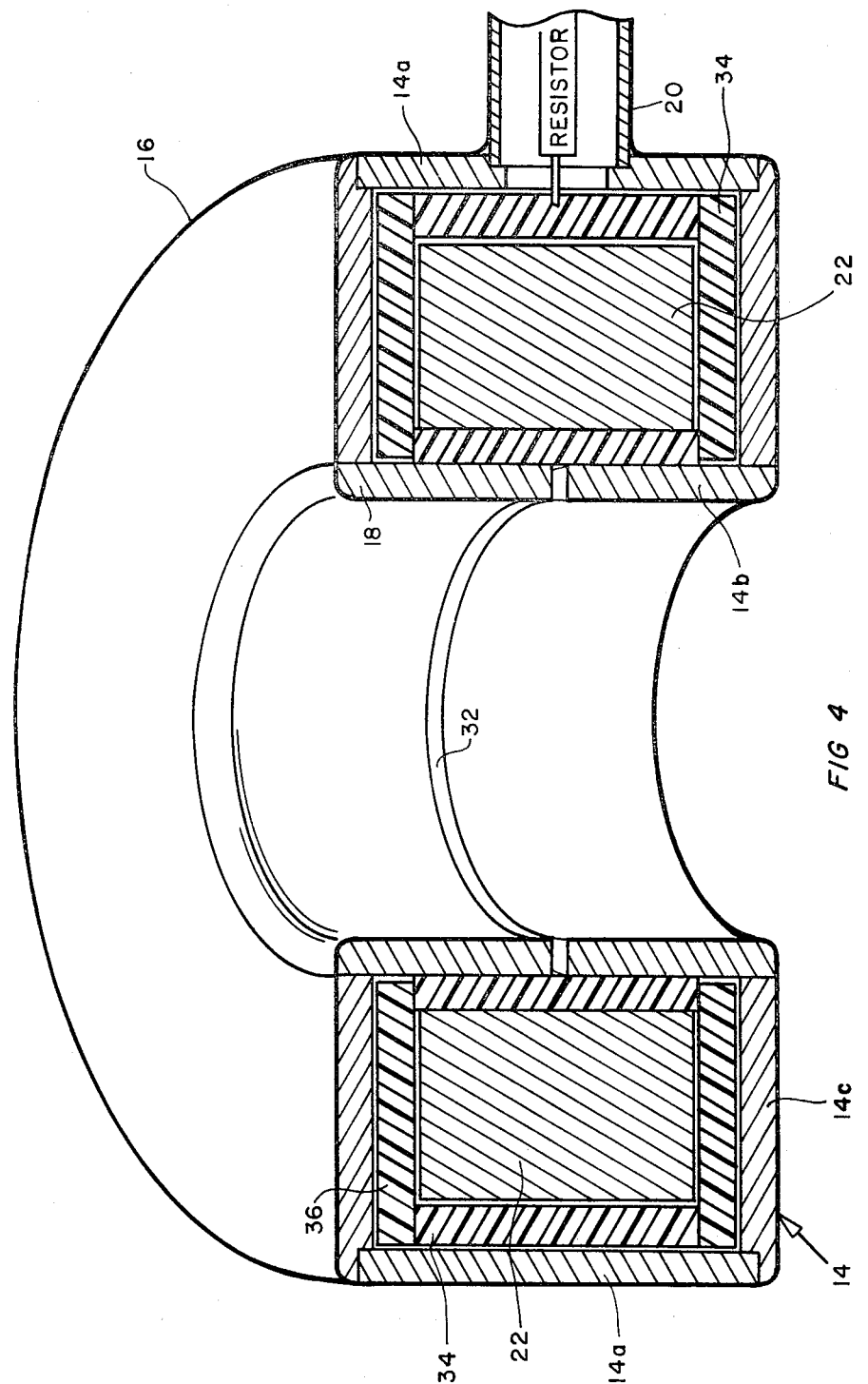
FIG. 4 is a fragmentary perspective view to a larger scale, with certain portions cut away to reveal internal construction.

Turning now to FIG. 4, the bottom portion of the toroidal case 14 is revealed to be substantially U-shaped in cross section, with the cover portion 16 disposed at the upper ends of the arms of the U. More particularly, the outer periphery of the cover 16 closely interfits with the upper edge of the outside shell member 14a of the case 14, whereas the inner shell member 14b does not rise high enough on the interior of the case as to contact the inner flange 18 of the cover. As shown in FIG. 4, the members 14a and 14b are generally cylindrical. In order to prevent the case forming a shorted turn, I preferably cause a circumferential gap 32 of say 0.025 inches to exist between the inner shell member 14b and the inner flange 18. The case is preferably of copper 0.062 inches thick.

Although the lower portion of case 14 can obviously be made in one piece, I may prefer for the case to be made by soldering the lower peripheral surfaces of members 14b and 14a to the radially inner and radially outer circular edges of the substantially flat bottom member 14c. Also as shown in this figure, the upper edge of flange 18 is soldered to the radially inner edge of the substantially flat cover member.

The soldering operations are obviously carried out before the installation of the coil assembly 12, thus to avoid any heat damage to the insulating material. However, it should be noted that the juncture of the outer periphery of the cover member with the upper edge of the member 14a is not a soldered joint, but rather is a joint completed by silver epoxy or the like, the requirement being that the joint be highly conductive.

Also revealed in FIG. 4 is the fact that I preferably dispose a layer 34 of insulative material inside the case 14 between the sides and bottom of the case, and the coil assembly 12, this serving to physically locate the coil with respect to the case, to protect the wiring of the coil, and to prevent shorting. I prefer to use a soft, pliable material, such as expanded polyethylene or the like. FIG. 1 reveals the use of a ring 36 of the same insulative material on the inside of the cover portion of the case. Although I am not to be limited to comparatively soft insulative material, the advantage of using expanded polyethylene is that the coil assembly can be easily removed for servicing at a later date.

Figure 5:
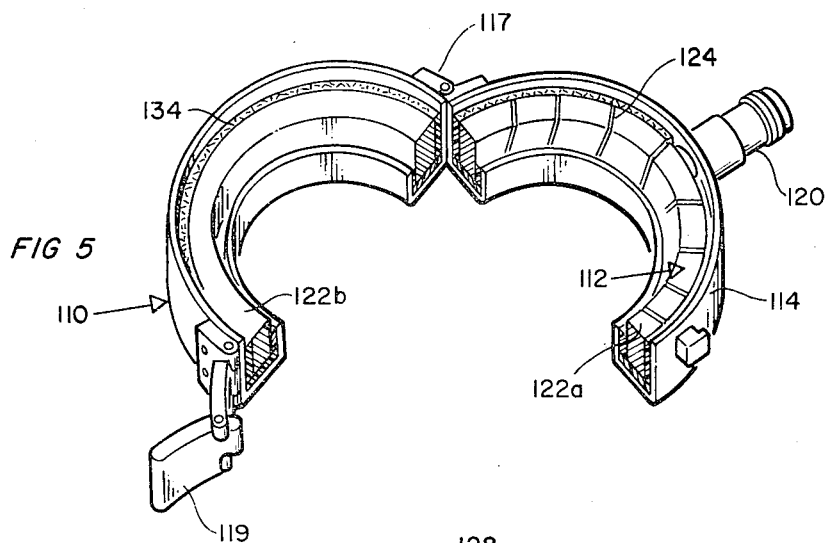
FIG. 5 is a perspective view of a split probe embodiment of my invention, involving a device that can be opened to pass around one or more conductors whose end or ends are not available to be passed through a fixed toroidal probe.

Turning now to FIG. 5, it will be noted that I have there depicted a split or clamp-on type probe 110 in accordance with this invention, involving a coil assembly 112 disposed in a hinged toroidal case 114 of conductive, nonmagnetic material. A cover 116 much like that of FIG. 1 is utilized for completing the enclosure of the core assembly while still leaving a gap; note gap 132 in FIG. 7. However, the cover portion is split in the same manner as the rest of the case 114 to enable the probe to be fitted around the wire or wire bundle whose end is not available to be passed through a non-split toroid.

A hinge 117 may be utilized such that the probe halves remain essentially in one plane as they are separated, although of course the hinge could be of a type such that one portion of the case moves upwardly (or downwardly) with respect to the other to achieve separation. A latching arrangement 119 can be used to secure the halves together, in the proper operating position.

Unlike the embodiment shown and described in conjunction with FIG. 1, the coil assembly 112 principally involves split Ferramic core members 122a and 122b, with bifilar winding 124 being disposed on member 122a. In the half of the case in which the bifilar winding 124 is disposed, a connector 120 is provided such that the signal generated in the probe may be connected to the circuitry involved in the amplification and recording of the data. The other core half 122b is not provided with a winding connected to external circuits, but optionally a separate winding may be placed on 122b which terminates in a proper resistance, and acts as a bias winding. This separate or ancillary winding enhances the over-all frequency response of the split probe.

It should be noted that the ends of the core members 122a and 122b are prepared in such a manner that when the case is moved to the closed position and latched, the two pairs of core ends fit closely together so as to hold the reluctance of the magnetic path to a minimum. The ends may be lapped to a 5 micron finish. Preferably a ring of rubberlike insulative material such as RTV-102 is disposed between each core half and the case, as shown at 134 in FIG. 8, with the arrangement being such that the core ends actually protrude slightly beyond the confines of the case. The distance may be say 0.003 inches. The result of this arrangement is of course to cause the insulative material to be compressed somewhat when the case is closed and latched, this having the result of assuring the desired intimate contact between the pairs of core ends.

Figure 6:
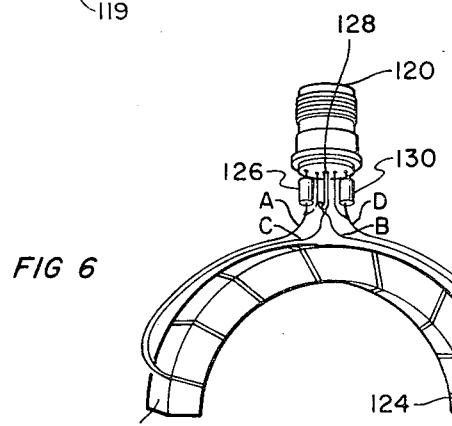
FIG. 6 is a view of the active portion of the core assembly of the device shown in FIG. 5.
Figure 7:
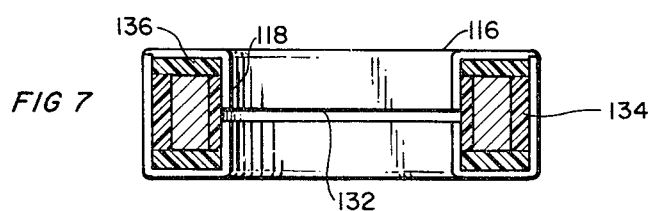
FIG. 7 is an edge view of the split probe.
Figure 8:
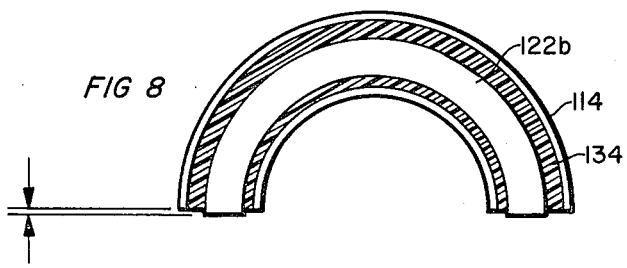
FIG. 8 is a plan view of a portion of the split probe, revealing the manner in which the split core extends slightly beyond the confines of the case.

Referring to FIG. 6, it will be noted that the pairs of leads from each terminus of the bifilar winding 124 is connected to the output connector 120 in the same general manner described in conjunction with the embodiment of FIG. 1. More particularly, end A is connected to one terminal of the connector 120 and to trimming component 126, whereas adjacent wire end C is connected to grounding post 128. Likewise, with regard to ends B and D from the other end of the bifilar winding, end B is connected to the grounding post, and end D to the other terminal of the connector 120 as well as to trimming component 130. Thus, the same basic coil arrangement is achieved in the split embodiment of the invention as was present in the primary embodiment, but with the probe on some occasions having somewhat diminished frequency response. More particularly, whereas the embodiment in accordance with FIG. 1 had a flat frequency response within 3 db between 50 KH$_z$ and 100 MH$_z$, the split probe has a flat frequency response within 6 db over this frequency range.

In FIG. 6, the arrangement has been slightly exaggerated in the interests of clarity, for in reality the wire ends or leads do not stand away from the coil assembly as shown in this figure. However, neither do they touch the turns of wire disposed on the core. I have evolved an arrangement in accordance with which an insulative material is disposed so as to extend around the upper portion of the core half 122a as viewed in FIG. 6, closely adjacent the windings 124 to prevent the windings from being shorted out. Then, after the wire ends have been placed against this insulative material, two separate pieces of insulative material are placed atop the wire ends or leads, extending just short of connector 120, thus evolving a sheath or encapsulation of these wire ends. I have found that fiberglass cloth is the best material to use. Fiberglass cloth having adhesive on one side is preferred, such as, for example, fiberglass tape. This type of arrangement obviously facilitates establishing and maintaining an envelope about the wire ends or leads.

Figure 9:
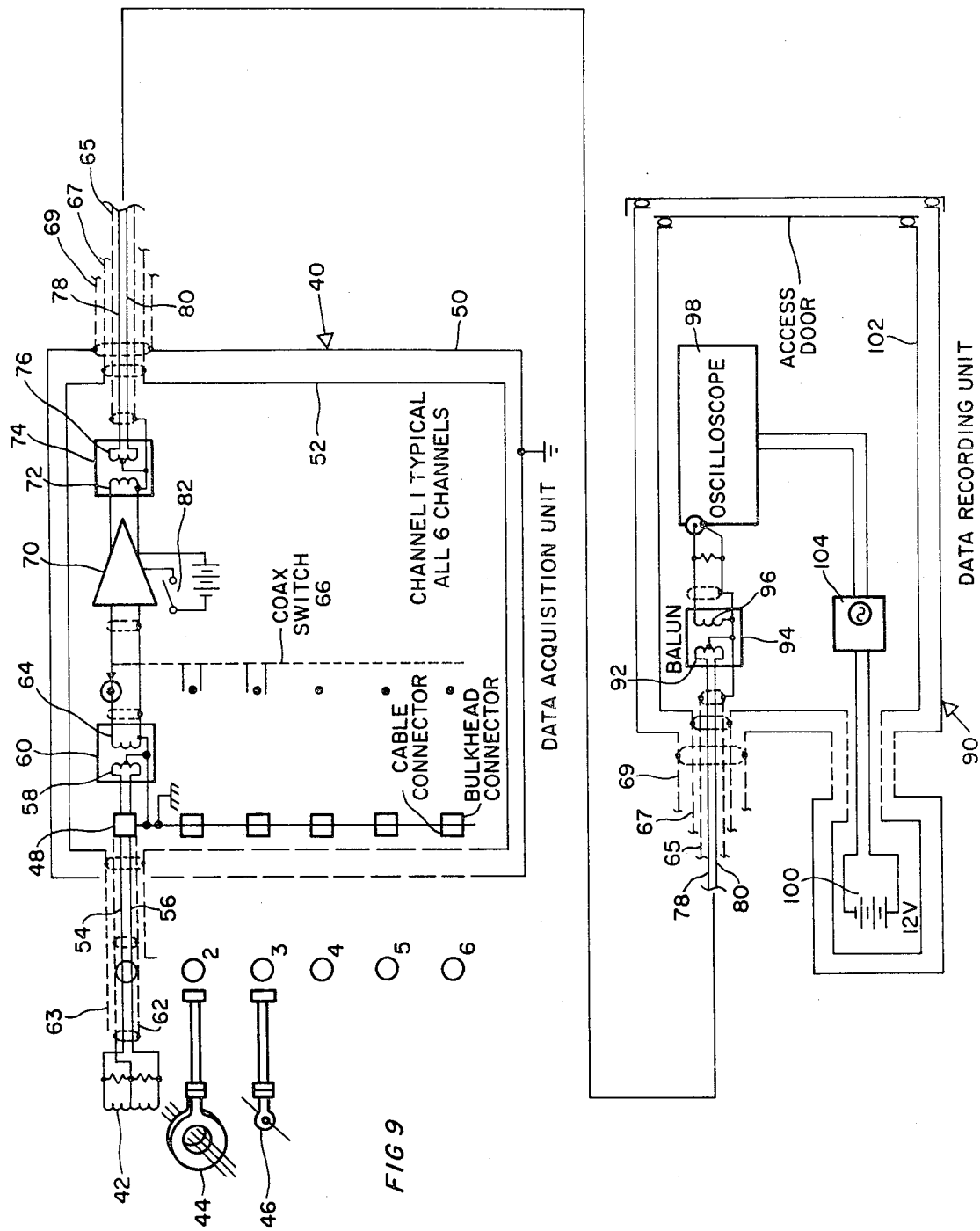
FIG. 9 is a schematic representation of the data acquisition unit and the data recording unit, with which a plurality of probes in accordance with this invention may be used.

Turning to FIG. 9, it will be seen that I have there shown a typical arrangement of sensitive means by which data is derived from a probe arrangement, and recorded. Six or so probes, partially represented here by probes 42, 44 and 46, may be attached by comparatively short, shielded cables to the input connectors, such as connector 48, of a data acquisition unit 40. The unit 40 is in turn connected to a data recording unit 90. Because the unit 40 is designed to be disposed directly in the high flux field, it is desirable to utilize a double walled enclosure, in which the outside enclosure 50 is grounded such as to the frame of a missile whose leads are being tested, with the inside enclosure 52 representing an electrically separate component in the nature of a floating shield. This latter shield is preferably not grounded, but if it must be grounded, it is preferably grounded at the oscilloscope signal input ground in the data recording unit 90.

In the embodiment shown in FIG. 9, the probe 44 is along the lines of the probe illustrated and described at length hereinbefore, with conductors whose current flow is being measured being disposed through the central aperture of the probe. Probe 46 is a smaller device, for use with a smaller conductor.

Probe 42 is shown schematically so as to reveal the manner in which its balanced wiring arrangement is connected to provide input information to the sensitive portions of the data acquisition unit 40. A pair of leads 54 and 56 represents a balanced arrangement by which input information is carried from the probe windings to the balanced input winding 58 of balun 60. The balun 60 must also be a highly symmetrical device. The input winding 58 is center tapped, with this center tap being connected to the shield 62 directly surrounding the leads of probe 42, as well as to one side of the output winding 64 of the balun, thus converting from a balanced input arrangement to a single ended input. The shield 62 is in turn surrounded by a shield 63 grounded to the inner enclosure 52.

Coaxial switch 66, the location for which is schematically indicated in FIG. 9 by the use of dashed lines, enables the inputs from the several probes to be selectively and individually connected to the low noise wideband preamplifier 70 at the behest of the operator. The preamplifier 70 may be utilized in conjunction with a pressure switch 82 such that the amplifier can be turned on by application of pressure to the unit 40 through a pneumatic line (not shown), thus avoiding an electric or magnetic coupling. The preamplifier has a bandwidth compatible with the bandwidth of the probes, and preferable has a gain of 26 db, with its output being provided to the input winding 72 of balun 74, and its case grounded to the center tap of winding 58. The grounded side of the winding 72 is also connected to the center tap of output winding 76, with the output leads 78 and 80 from the balun 74 carrying a signal that is again balanced. This pair of leads extends to the data recording unit 90, being shielded by a signal shield 65 connected to the center tap of winding 76 as well as to the center tap of input winding 92 of the balun 94 of the data recording unit; and to the housing of oscilloscope 98.

The signal shield 65 is in turn surrounded by an inner shield 67 grounded to the inside enclosure 52 of the unit 40, and to the inside enclosure 102 of data recording unit 90. In addition, an outer shield 69 may surround the shield 67, which outer shield is connected to outside enclosure 50 as well as to the outside enclosure of unit 90.

It should be recognized that the signal cabling between the probes and the data acquisition unit 40, as well as between the data acquisition unit and the data recording unit 90 must also be highly symmetrical. It was found necessary to specially construct a cable for this utilization so as to achieve over-all common mode rejection ratios of 30 db at 100 MH$_z$. Ratio is important when endeavoring to acquire low level data of say 100 microamperes, in a high level environment of say 100,000 volts per meter.

The leads 78 and 80 carrying the balanced input signal to device 90 are connected to input winding 92 of balun 94. This balun serves to provide a single ended output to the oscilloscope 98 by means of its output winding 96.

The oscilloscope 98 may for example be a Tektronix Model 454, which is an exceedingly fast real time instrument arranged to present data on a cathode ray tube face. Preferably used in conjunction with this oscilloscope is a Tektronix camera, Model C-31, that is arranged to photograph the face of the CR tube. The system is so synchronized that pulses in the order of 500 nanoseconds time duration may readily be recorded on film. This data on film can thereafter be utilized for frequency domain analysis, after being digitized.

Power supplied for proper operation of the oscilloscope and camera must be contained within the over-all shielding arrangement in order to avoid contamination due to exposure of the power source to the hostile environment. To this end, I prefer to place the battery 100 inside the double-walled enclosure of the data recording unit, or some suitable double-walled extension therefrom. Battery 100 supplies power to static inverter 104, which is a low-noise device applying 115v to the data recording means, while avoiding the radiation of transient fields which normally accompanies commercially available inverters. I prefer to use an inverter having a bifilar wound toroidal power transformer to reduce the transients in the transformer of the inverter.

As will now be apparent, in addition to utilizing a novel, balanced probe, I utilize a carefully balanced system in which every precaution is taken to maintain balance and to exclude contamination from the high flux environment. For example, the signal leads 54 and 56 are shielded by shield 62 grounded to the center tap of balun input winding 58, as previously mentioned. This ground potential is of course maintained through to the case of amplifier 70, the center tap of windings 76 and 92, and to the case of oscilloscope 98. Around shield 62 is a floating shield 63, that connects to the inner enclosure 52, with this potential also being the same as in the inner shield 67 surrounding the signal shield 65 associated with the signal leads 78 and 80.

An additional or outer shield 69 may surround the shield 67 and extend between the units 40 and 90, connecting to the outer enclosures of each so as to form a Faraday type shield.

As should now be apparent, I have provided a balanced current probe capable of accurately sensing very small, time-varying currents flowing in a conductor when such conductor is disposed in a very strong E field environment. Significantly, the output of the probe is a measure only of the current flowing through the conductor, with no significant contamination due to the external field.

I claim:

1. A wideband balanced current probe for use in obtaining time varying data in a hostile environment involving high electric and magnetic fields, comprising a coil assembly of generally toroidal configuration disposed in a case forming a shield, said coil assembly comprising a core and a bifilar winding disposed upon said core, said bifilar winding being constituted by a pair of windings in which the impedance of one winding is virtually identical to the impedance in the other winding, said case also having an output connector to which the ends of said bifilar winding are connected in a balanced manner, with the interconnection of said windings being such that any signals induced into the pair of windings by a contaminating field will be canceled, whereby when a current carrying conductor is disposed through the open portion of said toroidal coil assembly, the time-varying current flowing through the conductor can be measured, and transferred to an external location without contamination by the high fields.

2. The probe as defined in claim 1 in combination with a data acquisition unit to which said output connector is electrically connected, said electrical connection involving the use of multiple shielded leads, said data acquisition unit involving means for simultaneously utilizing a number of probes, but with switching means being provided such that an output reading can be obtained from a selected probe by suitable operation of said switching means.

3. The wideband current probe as defined in claim 1 in which said case and said coil assembly are split, with the case being hinged to permit the core portions to be moved apart and thus placed around at least one conductor whose end is not available to be passed through the toroid, and means for holding the case in a closed, toroid-completely position after being placed around the conductor.

4. A wideband, highly symmetrical balanced probe for use in sensing time varying current flowing in a conductor disposed in a high electric and/or high magnetic field, comprising a coil assembly of toroidal configuration, a case of conductive, nonmagnetic material disposed in surrounding relation about said coil assembly to accomplish the shielding thereof from said fields, said case having an output connector equipped with terminals, said coil assembly comprising a core, and a bifilar winding disposed for a plurality of turns about said core, with one wire of each terminus of said bifilar winding being electrically attached to a respective terminal of said output connector, with the other wire of each terminus being connected to the body of the output connector, whereby when a shielded conductor is attached to the terminals of said connector, the signal generated in said winding can be transferred to a remote location without contamination by the high fields.

5. The balanced probe as defined in claim 4 in which output leads are attached to said output connector, which leads are connected to sensitive means for acquiring and recording the data derived by the use of said probe, said leads being shielded as they extend between components, said leads and the components used in said acquiring and recording means in connection with the obtaining of data being carefully balanced.

6. The wideband current probe as defined in claim 4 in which said case and said coil assembly are split, with the case being hinged to permit the portions of the coil assembly to be moved apart and thus placed around at least one conductor whose end is not available to be passed through the toroidal coil assembly, and means for holding the case in a closed, toroid-completing position after being placed around the conductor.

* * * * *